US007616398B2

(12) United States Patent
Gong et al.

(10) Patent No.: US 7,616,398 B2
(45) Date of Patent: Nov. 10, 2009

(54) FLY HEIGHT ADJUSTMENT DEVICE CALIBRATION

(75) Inventors: Heng Gong, San Jose, CA (US); Mike X. Wang, San Jose, CA (US); Jing Zhang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 166 days.

(21) Appl. No.: 11/983,474

(22) Filed: Nov. 9, 2007

(65) Prior Publication Data

US 2009/0122437 A1    May 14, 2009

(51) Int. Cl.
G11B 5/60 (2006.01)
(52) U.S. Cl. ........................................ 360/75
(58) Field of Classification Search ................ None
See application file for complete search history.

(56) References Cited

U.S. PATENT DOCUMENTS

| 5,545,989 | A | 8/1996 | Tian et al. | |
|---|---|---|---|---|
| 6,008,640 | A | 12/1999 | Tan et al. | |
| 6,700,724 | B2 | 3/2004 | Riddering et al. | |
| 7,180,692 | B1 | 2/2007 | Che et al. | |
| 2002/0097517 | A1 | 7/2002 | Bonin et al. | |
| 2004/0032681 | A1 | 2/2004 | Smith et al. | |
| 2006/0002001 | A1 | 1/2006 | Fong et al. | |
| 2006/0139789 | A1 | 6/2006 | Yang | |
| 2007/0127148 | A1* | 6/2007 | Yokohata et al. | 360/75 |
| 2007/0133118 | A1* | 6/2007 | Kajitani | 360/75 |
| 2007/0230002 | A1* | 10/2007 | Kassab | 360/75 |
| 2007/0230018 | A1* | 10/2007 | Schreck et al. | 360/75 |

FOREIGN PATENT DOCUMENTS

| JP | 58141468 | 8/1983 |
|---|---|---|
| JP | 62132282 | 6/1987 |

OTHER PUBLICATIONS

Schardt, et al., "Flying Height Measurement while Seeking in Hard Disk Drives", *IEEE Transactions on Magnetics*.vol. 34, No. 4., Jul. 1998,1765-1767.
Lopez, Orlando "Reproducing Vertically Recorded Information-Double Layer Media", *IEEE Transactions on Magnetics*, vol. MAG-19, No. 5, Sep. 1983,1614-1616.

(Continued)

*Primary Examiner*—Hoa T Nguyen
*Assistant Examiner*—James L Habermehl

(57) ABSTRACT

A method for calibrating a fly height adjustment device comprises flying a magnetic transducer coupled with a head gimbal assembly at a fly height from a magnetic recording data track. The magnetic transducer is coupled with a fly height adjustment device. Read-back signal amplitude is read from the magnetic recording data track with the magnetic transducer. The fly height is decreased with the fly height adjustment device. A linear fly height prediction is generated from the read-back signal amplitude and from power delivered to the fly height adjustment device as the fly height is decreased. The power delivered to the fly height adjustment device is compared with a difference between the linear fly height prediction and an implied fly height from the read-back signal amplitude, thereby calibrating the fly height adjustment device.

25 Claims, 6 Drawing Sheets

OTHER PUBLICATIONS

Gong, et al., "Pole-Tip Protrusion Effect on Head-Disk Interface at Low Flying Clearance", *IEEE Transactions on Magnetics*, vol. 41, No. 10,3019-3021.

Bhushan, et al:, "Role of Disk Surface Roughness on Slider Flying Height and Air-Bearing Frequency", *IEEE Transactions on Magnetics*, vol. 26, No. 5, Sep. 1990,2493-2495.

Tanaka, et al., "Slider Dynamics During Continuous Contact with Textured and Smooth Disks in Ultra Low Flying Height", *IEEE Transactions on Magnetics*, vol. 37, No. 2, Mar. 2001,906-911.

Glinsner, et al., "Nanoimprint lithography enables patterned tracks for high-capacity hard disks", *Mentor Graphics/Solid State Technology*, Mar. 2005,1-5.

Jayasekara, Wipul P., "An Active Flying Slider for Magneto-Optic Disk Focusing", *Department of Electrical and Computer Engineering/ Carnegie Mellon University*, Aug. 1993,1-43.

\* cited by examiner

600

```
Fly a magnetic transducer coupled with a fly
height adjustment device at a fly height from
a magnetic recording data track.
610
          │
          ▼
Read a read-back signal
amplitude from the magnetic
recording data track.
620
          │
          ▼
Decrease the fly height with the
fly height adjustment device
630
          │
          ▼
Generate a linear fly
height prediction
640
          │
          ▼
┌─────────────────────────────────────────────────────────────────┐
│ ┌──────────────────┐  ┌──────────────────────────────────────┐ │
│ │ Determine fly    │  │ Identify power delivered to a fly    │ │
│ │ height adjustment│  │ height device for                    │ │
│ │ device efficiency│  │ effecting contact of magnetic        │ │
│ │                  │  │ transducer with magnetic recording   │ │
│ │      652         │  │ data track                           │ │
│ │                  │  │              654                     │ │
│ └──────────────────┘  └──────────────────────────────────────┘ │
│ ┌──────────────────────┐  ┌──────────────────────────────────┐ │
│ │ Determine power to   │  │ Defining starting power level    │ │
│ │ establish a desired  │  │ for a fly height adjustment      │ │
│ │ fly height from fly  │  │ device from an inflection point  │ │
│ │ height adjustment    │  │ in a power curve                 │ │
│ │ device efficiency    │  │              658                 │ │
│ │        656           │  │                                  │ │
│ └──────────────────────┘  └──────────────────────────────────┘ │
│                                                                 │
│ Compare the power delivered to the fly height adjustment       │
│ device with a linear fly height prediction and implied fly     │
│ height from the read-back signal amplitude                     │
│                         650                                     │
└─────────────────────────────────────────────────────────────────┘
```

FLY HEIGHT ADJUSTMENT DEVICE CALIBRATION

TECHNICAL FIELD

This invention relates generally to the field of direct access storage devices and in particular to calibrating a fly height adjustment device by analyzing Wallace equation spacing verses power to the fly height adjustment device.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

The amount of data that can be stored on a disk is governed by many well known physical principles. There exists a direct relationship between the distance that a magnetic transducer is spaced from the recording media and the amount of data that can be stored on the disk. This distance is typically known as "fly height." This relationship is expressed by the Wallace equation, which is well understood in the art of magnetic recording. The Wallace equation demonstrates that as fly height increases, the amount of data that can be stored on the media decreases. Conversely, as fly height decreases, the amount of data that can be stored on the media increases. The Wallace equation expresses the importance of controlling fly height so that data density can be controlled.

Historically, fly height of a magnetic transducer has been controlled through the design of the slider, upon which the magnetic transducer is coupled. The slider comprises a surface known as an ABS (air bearing surface) which in operation faces the media of a magnetic recording disk. The ABS is patterned and configured such that as the disk spins adjacent to the ABS, a film of air is created which provides spacing and support for the magnetic transducer away from the spinning disk media. The ABS is designed using well understood principles of aerodynamics and fluid flow.

The ever increasing demand for data density has made the small variations in fly height, which are inherently caused by manufacturing tolerances and the operating environment of the HDD, unacceptable. The ABS by itself can no longer keep pace with demands for increased data density. The Wallace equation implies that increased data density requires decreased fly height. Decreased fly height creates challenges for reliability and increases the risk of a head crash and lost data.

SUMMARY OF THE INVENTION

Various embodiments of the present invention are described herein. A method for calibrating a fly height adjustment device comprises flying a magnetic transducer coupled with a head gimbal assembly at a fly height from a magnetic recording data track. The magnetic transducer is coupled with a fly height adjustment device. Read-back signal amplitude is read from the magnetic recording data track with the magnetic transducer. The fly height is decreased with the fly height adjustment device. A linear fly height prediction is generated from the read-back signal amplitude and from power delivered to the fly height adjustment device as the fly height is decreased. The power delivered to the fly height adjustment device is compared with a difference between the linear fly height prediction and an implied fly height from the read-back signal amplitude, thereby calibrating the fly height adjustment device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is a flow chart illustrating a process for calibrating a fly height adjustment device in accordance with one embodiment of the present invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a description and overview of the manufacturing environment of a fly height adjustment devices and an apparatus used for calibrating a fly height adjustment device. The discussion will then focus on embodiments of the present invention by which a fly height adjustment device is calibrated.

Overview

Figure 1:
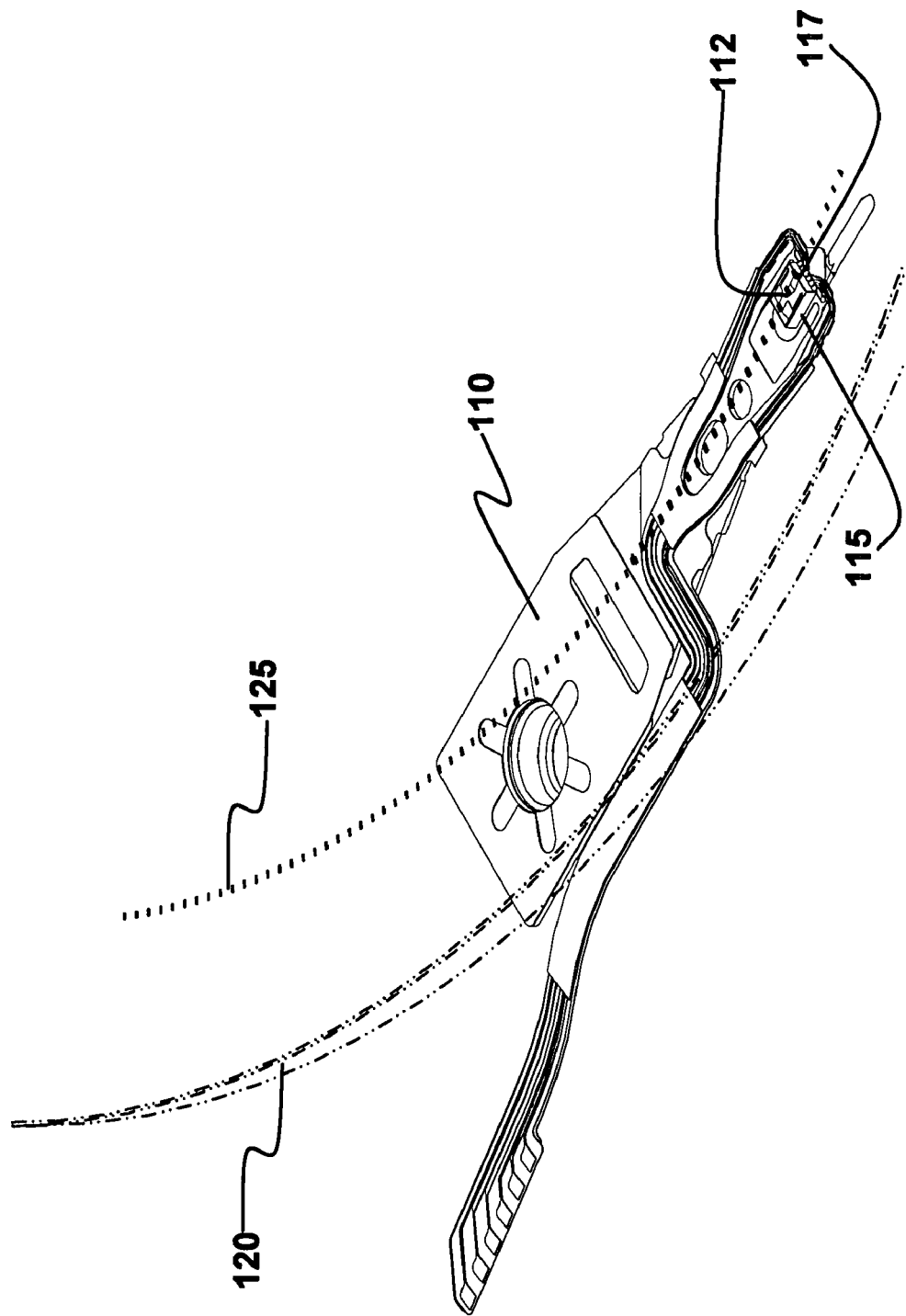
FIG. 1 is an isometric of head gimbal assembly (HGA) operable to embodiments of the present invention.

With reference to FIG. 1, an isometric of head gimbal assembly (HGA) 110 operable to embodiments of the present invention is presented. The fly height of a magnetic transducer is the distance of separation of magnetic transducer 117 to magnetic recording data track 125. Magnetic transducer 117 is coupled with a slider 115 such that magnetic transducer 117 follows nearly every motion of slider 115.

Historically, fly height of a magnetic transducer has been controlled through the design of the slider, upon which the magnetic transducer is coupled. Slider 115 comprises a surface known as an ABS (air bearing surface) 112 which in operation faces media 122 of magnetic recording disk 120. Magnetic recording disk 120 is presented with phantom lines so that magnetic recording data track 125 and features of HGA 110 that face magnetic recording disk 120 are visible. ABS 112 is patterned and configured such that as disk 120 (a section of which is shown with phantom lines in FIG. 1) spins adjacent to ABS 112, a film of air is created which provides spacing and support for slider 115 and magnetic transducer 117 away from media 122 of spinning disk 120. ABS 112 is designed using well understood principles of aerodynamics and fluid flow.

The fly height, at which magnetic transducer 117 flies is determined primarily by ABS 112 of slider 115. It is appreciated that other parameters of the hard disk drive (HDD) in which HGA 110 operates, determine the fly height of magnetic transducer 225. The design and fabrication of the ABS sets the fly height of the slider for nominal operating conditions. The fly height is tested in the factory and the slider with its coupled magnetic transducer is shipped as part of an HDD to the customer. The fly height of the magnetic transducer is influenced by many randomly occurring factors beyond the control of the ABS and HDD designers. Examples of these factors are: temperature, atmospheric pressure, contamination, and mechanical shock.

Changes in fly height can affect the performance of the HDD. If the magnetic transducer flies too high, the amplitude of the read-back signal becomes too weak against background noise. If the magnetic transducer flies too low, there is the exposure and risk of the magnetic transducer contacting the disk. The consequences of contacting the disk can range from a perturbation in the read-back signal, necessitating a retry to read data, to a catastrophic head crash, whereby the disk surface is damaged and a customer's data is destroyed.

There has been a long felt need in the HDD art to have a means for adjusting fly height. Some examples of fly height adjustment devices are: a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media; and a thermal fly height control (TFC) coupled with a magnetic transducer to urge the magnetic transducer closer to the magnetic recording media.

ABS 112 is designed to fly magnetic transducer 117 at a target fly height. The above examples of fly height adjustment devices are designed to produce a target adjustment for a specific amount of power. With today's stricter demands on fly height control, it is not sufficient to apply one power setting to a group of fly height adjustment devices and expect to produce the required fly height. This may shift the fly height distribution of a population of sliders, but it will not adjust any one fly height adjustment device and magnetic transducer combination to meet a specific fly height.

This is due in part to the distribution of tolerances of parameters that comprise the fly height of magnetic transducer 117. Examples of these parameters are: various etch depths comprising an ABS; mask image alignment that determine the areas of etching on an ABS; alumina recession from an ABS forming process; alignment of an ABS to a slider and magnetic transducer; alignment of an ABS to a load point on an HGA. One of ordinary skill in the art will appreciate that this list of example parameters that effect fly height is not an exhaustive list, and is only presented to demonstrate the degree of difficulty for controlling fly height. There are other sets of parameters at the HGA level as well as the HDD assembly level that affect fly height. Depending upon the fly height adjustment device used, there are tolerances to parameters that also affect the operation and amount of adjustment a fly height adjustment device can produce.

Regardless of the fly height adjusting device used, the actual fly height needs to be known before a meaningful adjustment can be made of any one fly height adjustment device and magnetic transducer combination. The next generation of HDD product can not rely upon applying the same power setting to all fly height adjustment device and magnetic transducer combinations and expect to achieve the tighter fly height tolerance demands.

Given the criticality of fly height to the performance of an HGA, such as HGA 110, it is desirable to test the fly height of all HGAs but often not practical to do so in a manufacturing environment because of the associated cost. Several test for fly height are well known and understood in the art.

A standard fly height measurement technique well known by one of ordinary skill in the art is flying slider 115 against a glass or quarts disk. Interferometry is used to infer the fly height from interference fringes of known wave lengths of light. Although this fly height measurement technique has evolved over the decades and has become more automated, it is still very expensive and time consuming. The cost of a spin stand with support tooling, electronics, optics, and programming can cost upwards of $250K. Depending upon the spin stand, one fly height measurement can take about half a minute. Faster is better in a manufacturing environment. An example of a total test time budget on a manufacturing line is 12 seconds per HGA. For the reasons of cost and time, interferometry is often only used in a laboratory environment.

An option to measuring fly height well known to one of ordinary skill in the art is the technique of detecting low frequency noise (LFN) in the read-back signal. LFN relies upon a naturally occurring vibration of slider 115 to cause magnetic transducer 117 to oscillate the fly height separating magnetic recording data track 125. This mechanical oscillation of the fly height will cause a corresponding low frequency oscillation in the read-back signal amplitude. The low frequency oscillation in the read-back signal amplitude will change as the fly height decreases, and can eventually stop when slider 115 contacts disk 120.

Figure 2:
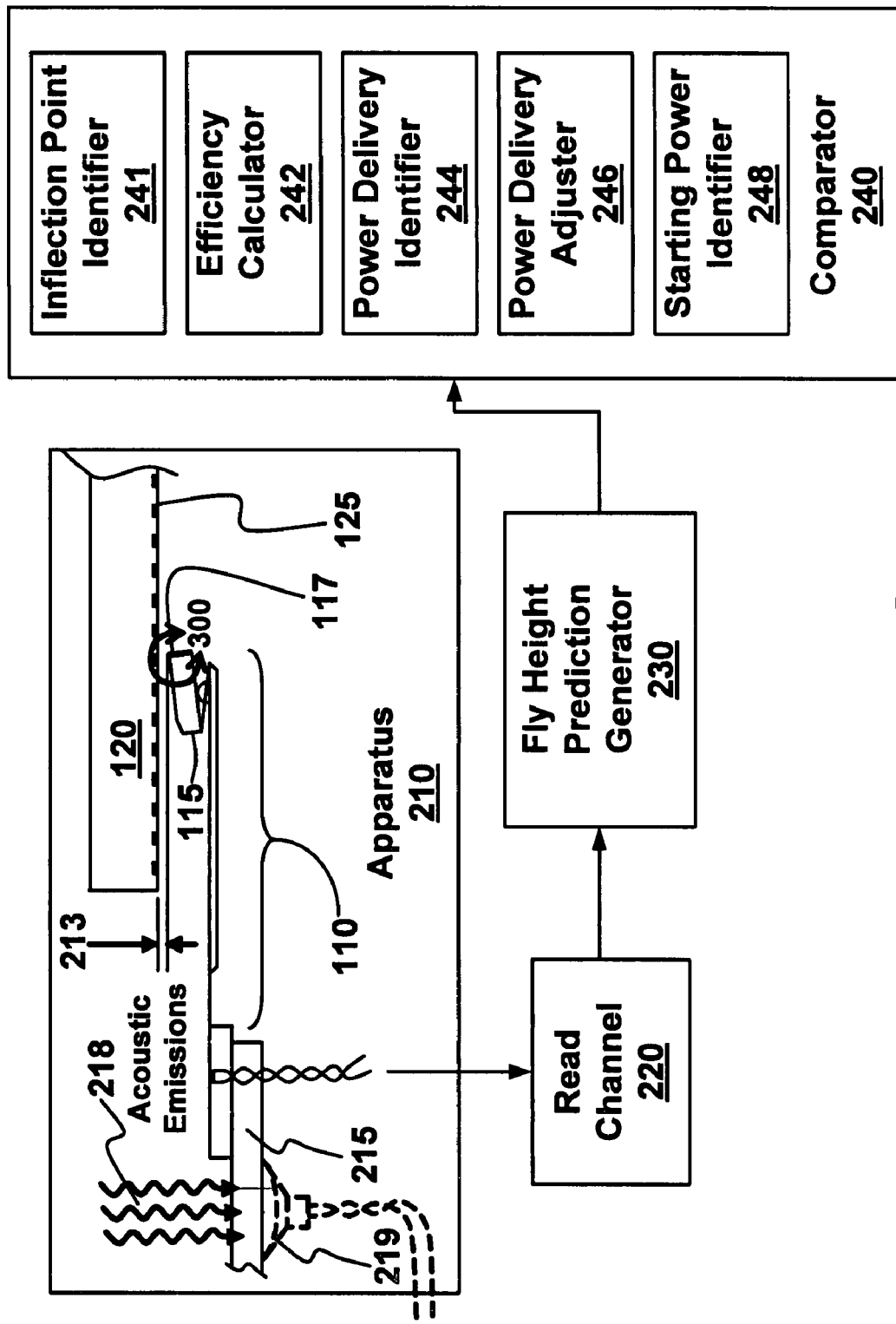
FIG. 2 is a block diagram of a system for calibrating a fly height adjustment device in accordance with one embodiment of the present invention.

Another option to measuring fly height well known to one of ordinary skill in the art is the technique of detecting acoustic emissions, or AE. With reference to FIG. 2, apparatus 210 presents AE detector 219. One of ordinary skill in the art appreciates that AE detector 219 detects acoustic emissions 218 by sensing a change in vibration transmitted through mounting surface 215 as slider 115 transitions from a flying condition to non-flying or contact condition with disk 120.

Both LFN and AE are presently the two primary options for detecting a flying or non-flying condition that are available to a manufacturer of HGAs. Both have their shortcomings. LFN relies upon an oscillation of slider 115 for detecting a flying and contact condition of slider 115. The designers of ABS 112 usually make efforts to design an ABS with minimal oscillation and high damping. A highly damped or non-oscillating ABS has better reliability and performance. A highly damped ABS can make LFN non-operational for detecting contact of slider 115 with disk 120.

It is appreciated that both AE and LFN do not measure fly height but detect the absence of flying. As presented above, an LFN can be defeated by a non-oscillating ABS. An AE can be defeated by a highly lubricated disk. Disk lubrication can mitigate vibrations from a slider as it contacts a disk. An AE can also deteriorate with time and lose its sensitivity to detecting the onset of slider/disk contact. An AE is cheaper than interferometry measurement techniques, but still costs about $40K to retrofit each HGA test station in an HGA tester. Approximately 100 HGA testers are required to support one HGA product on a manufacturing line. This is a substantial cost to a product, and its avoidance is very desirable.

Physical Description

With reference to FIG. 2, schematic diagram of system 200 for calibrating a fly height adjustment device is presented in accordance with one embodiment of the present invention. System 200 comprises apparatus 210 for flying magnetic transducer 117, which is coupled with a head gimbal assembly (HGA) 110, at operational fly height 213 from a magnetic recording data track 125, wherein magnetic transducer 117 is coupled with a fly height adjustment device.

Some examples of fly height adjustment devices are: a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media; and a thermal fly height control (TFC) coupled with a magnetic transducer to urge the magnetic transducer closer to the magnetic recording media.

With continued reference to FIG. 2 and in accordance with an embodiment of the present invention, apparatus 210 can be an HDD. In accordance with another embodiment of the present invention, apparatus 210 can be a stand alone device, such as a spin stand. In accordance with another embodiment of the present invention, apparatus 210 is comprised within a test apparatus such as dynamic electrical tester or DET. The DET is a marketed apparatus that measures the magnetic performance of a magnetic transducer flying over a spinning disk. Apparatus 210 comprises disk 120, which is operable to spinning about its axis in a manner similar to a disk operating within an HDD. Disk 120 comprises magnetic recording data track 125 written on a surface of disk 120 adjacent to magnetic transducer 117. Apparatus 210 comprises mounting surface 215 operable to aligning HGA 110 to magnetic recording data track 125 and operable to presenting HGA 110 to disk 120 for flying at fly height 213.

In accordance with an embodiment of the present invention, system 200 comprises read channel 220 for reading read-back signal amplitude from magnetic recording data track 125 with said magnetic transducer 117. Read channel 220 is similar to the read channel used in the HDD for which magnetic transducer 117 is designed.

In accordance with an embodiment of the present invention, system 200 comprises fly height prediction generator 230 for generating a linear fly height prediction from the read-back signal amplitude read by read channel 220 and from the power delivered to TFC 310 during the decreasing of operational fly height 213. In accordance with an embodiment of the present invention, fly height adjustment device is any fly height adjustment device, such as a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media.

In accordance with an embodiment of the present invention, system 200 comprises comparator 240. Comparator 240 is operable for comparing power delivered to a fly height adjustment device with a difference between a linear fly height prediction, which is generated by fly height prediction generator 230, and an implied fly height from the read-back signal amplitude from read channel 220. In so comparing, a fly height adjustment device is calibrated.

In accordance with an embodiment of the present invention, comparator 240 comprises an inflection point identifier for identifying an inflection point in the difference between a linear fly height prediction and an implied fly height. Identifying the inflection point determines when the magnetic transducer and the magnetic recording data track contact. In accordance with an embodiment of the present invention, comparator 240 comprises efficiency calculator 242 for determining the efficiency of fly height adjustment device. The ratio of the linear fly height prediction to the power delivered to fly height adjustment device determines the efficiency of fly height adjustment device.

In accordance with an embodiment of the present invention, comparator 240 further comprises power delivery identifier 244 for identifying the power delivered to fly height adjustment device for effecting contact of magnetic transducer 117 and magnetic recording data track 125. The power delivered for effecting contact is identified from the inflection point identified by inflection point identifier 241. In accordance with an embodiment of the present invention, comparator 240 further comprises power delivery adjuster 246, which utilizes the efficiency derived by efficiency calculator 242 to determine the power to be delivered to a fly height adjustment device to establish a desired fly height. In accordance with an embodiment of the present invention, comparator 240 further comprises starting power identifier 248 for defining a starting power level for a fly height adjustment device. The starting power level is that power level from which additional power is applied to establish a desired said fly height.

Operation

Figure 3:
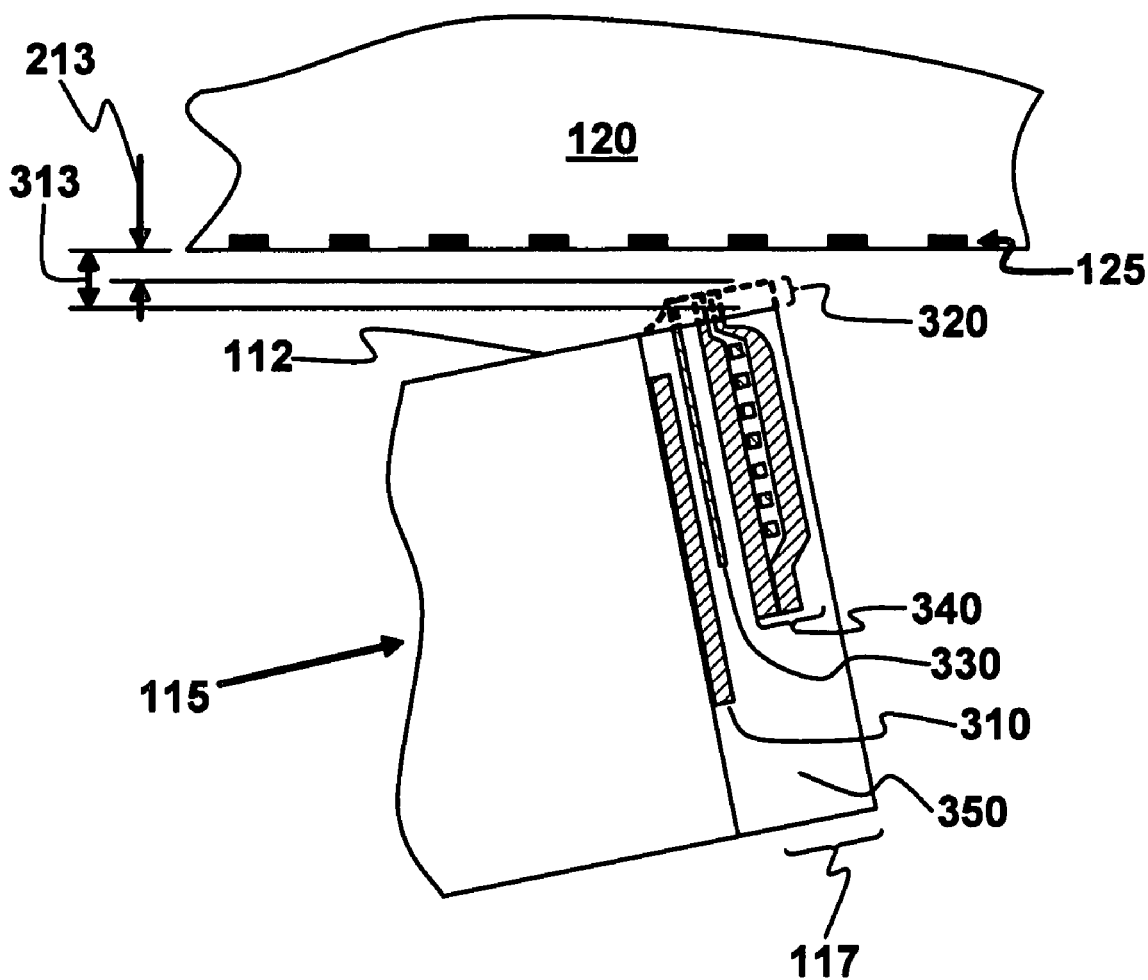
FIG. 3 is a side view detail of a magnetic transducer and a magnetic recording data track in accordance with one embodiment of the present invention.

With reference to FIG. 3, side view detail 300 of magnetic transducer 117 and magnetic recording data track 125 is presented in accordance with one embodiment of the present invention. In accordance with an embodiment of the present invention, the fly height adjustment device comprises TFC 310. TFC 310 is coupled to magnetic transducer 117 during deposition processes well known in the art, which sequentially fabricates TFC 310, magnetoresistive read element 330, and inductive write element 340. For the sake of brevity and clarity the discussion of the operation of fly height adjustment device will be in regard to TFC 310 as presented in FIG. 3. It is to be understood that TFC 310 is an example of a fly height adjustment device that is operable to the benefits of embodiments of the present invention. Embodiments of the present invention are not limited to TFC 310 as the fly height adjustment device.

Slider 115 is coupled with magnetic transducer 117. Magnetic transducer 117 comprises magnetoresistive read element 330, and inductive write element 340. TFC 310 as presented in FIG. 3 is coupled with magnetic transducer 117 and slider 115. Fly height 313 is in part the result of ABS 112, which is patterned and configured such that as the disk 120 spins adjacent to ABS 112, a film of air is created which provides spacing and support for the magnetic transducer away from the spinning disk media. Fly height 313 will be referred to as ABS fly height 313 to distinguish it from operational fly height 213, which in part is the result of ABS 112, but also includes the result of TFC 310.

Figure 4:
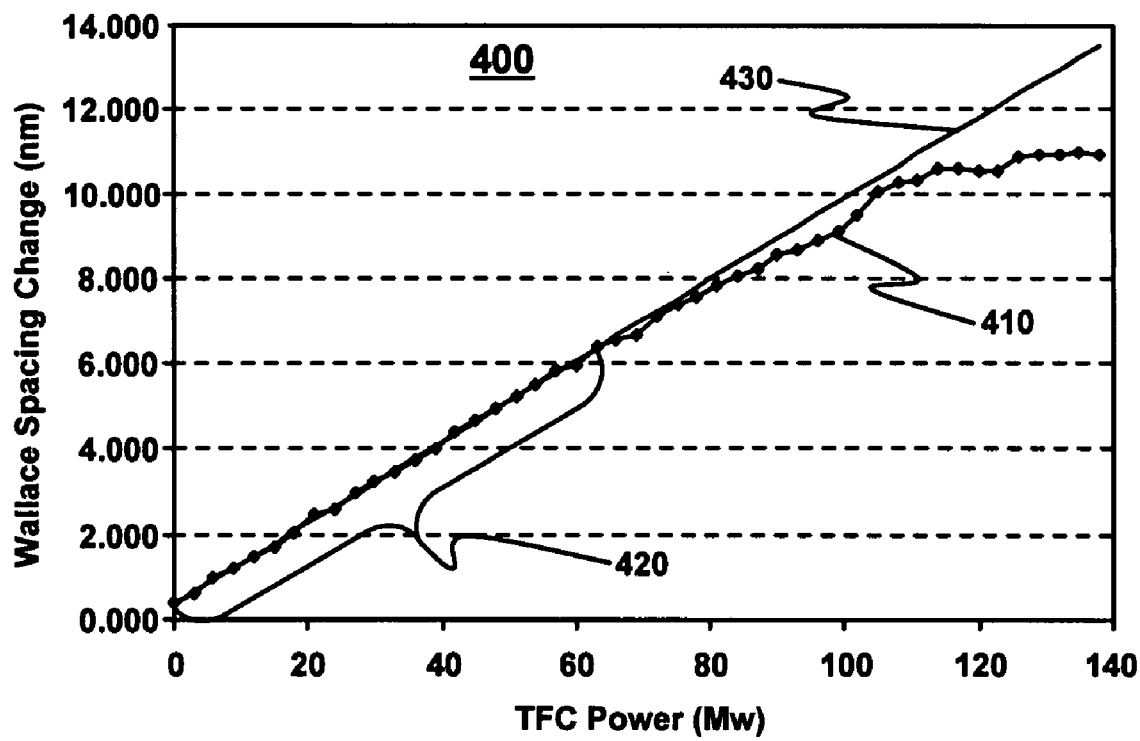
FIG. 4 is a plot of Wallace spacing change, verses fly height adjustment device power in accordance with one embodiment of the present invention.
Figure 5:
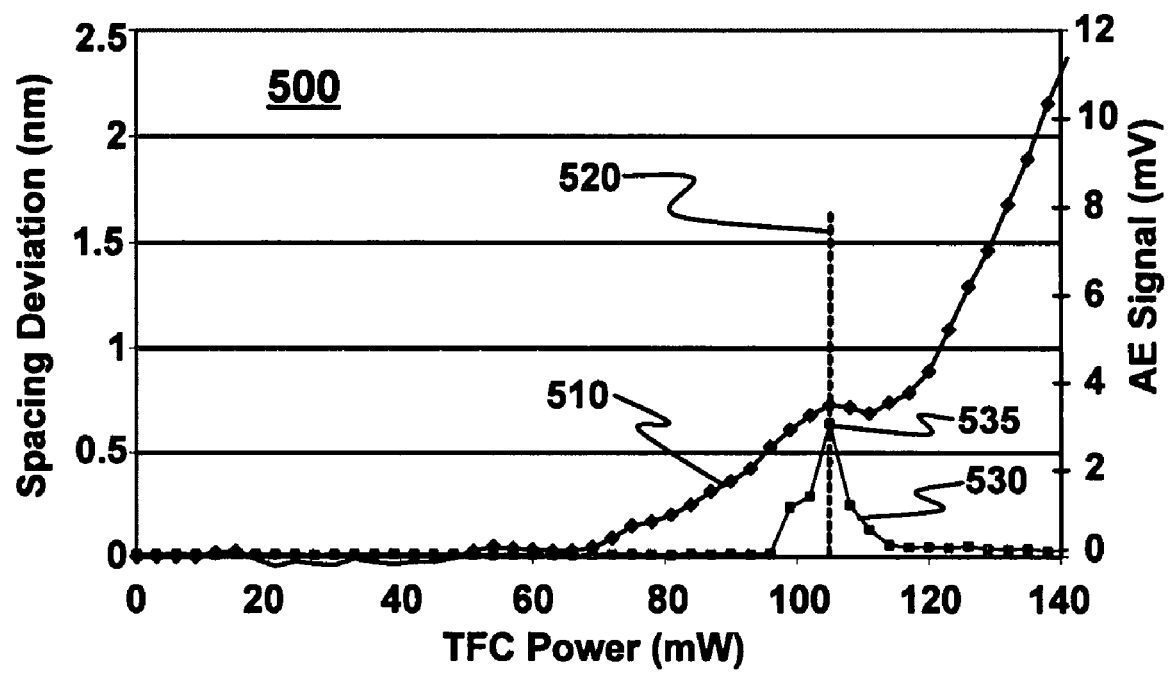
FIG. 5 is a plot of deviation from a linear prediction of fly height and implied fly height from the Wallace equation overlaid with AE signal, verses fly height adjustment device power in accordance with one embodiment of the present invention.

FIG. 4 and FIG. 5 will be described with reference to elements in FIG. 3. It is understood that data presented in plot 400 of FIG. 4 and plot 500 of FIG. 5 are examples of power delivered to a fly height adjustment device, such as TFC 310 and may differ depending upon the design of a fly height adjustment device being calibrated. Differences from one fly height adjustment device to the next may also display slightly different performance characteristics, which may result in a different plot 400 and plot 500 from those presented in FIG. 4 and FIG. 5. Tolerances in the manufacturing of an ABS as well as the tolerances in the manufacturing process for a fly height adjustment device can also result in variations in plot 400 and plot 500.

With reference to FIG. 4, plot 400 of Wallace spacing change verses fly height adjustment device power is presented in accordance with one embodiment of the present invention. The Wallace equation teaches that, as fly height increases, the amount of data that can be stored on the media decreases. Conversely, as fly height decreases, the amount of data that can be stored on the media increases. The Wallace equation expresses the importance of controlling fly height so that data density can be controlled. The Wallace equation is well known and understood by those of ordinary skill in the art of magnetic recording.

Plot 400 presents curve 410, which is Wallace spacing change verses TFC power. There exists a linear section 420 of curve 410 wherein a linear relationship exists between the power applied to TFC 310 and the spacing change predicted by the Wallace equation. The Wallace equation predicts fly height from the read-back signal amplitude, which is read from magnetic recording data track 125 by magnetic transducer 117. With reference to FIG. 3, as power is applied to TFC 310, protuberance 320 causes magnetic transducer 117 and the supporting material 350 in which TFC 310 and magnetic transducer 117 are embedded, to expand towards magnetic recording data track 125. Protuberance 320 reduces ABS fly height 313 to operational fly height 213. In the example of fly height adjustment device being TFC 310, as shown in FIG. 3, protuberance 320 is the result of TFC 310 heating supporting material 350 and magnetic transducer 117 thereby causing protuberance 320 to expand out of the plane of ABS 112 and toward disk 120 by thermal expansion. Thermal expansion is well understood by those of ordinary skill in the art.

In accordance with an embodiment of the present invention, power is delivered to TFC 310 and increases so as to cause protuberance 320 to expand closer toward magnetic recording data track 125. Power delivered to TFC 310 continues to increase and causes protuberance 320, which comprises magnetic transducer 117, to contact magnetic recording data track 125. Operational fly height 213 is reduced to zero. It is not obvious upon inspection of curve 410 at which power level delivered to TFC 310 that contact is made between magnetic transducer 117 and magnetic recording data track 125. Power may continue to be delivered to TFC 310 after contact between magnetic transducer 117 and magnetic recording data track 125 is made.

In accordance with an embodiment of the present invention, linear fly height prediction 430 is derived by extrapolating the linear trend of linear section 420 of curve 410. Beyond linear section 420, curve 410 deviates from linear fly height prediction 430.

With reference to FIG. 5, plot 500 of the deviation from linear fly height prediction 430 and curve 410 is presented in accordance with one embodiment of the present invention. Since linear fly height prediction 430 is derived by extrapolating the linear trend of linear section 420 of curve 410, deviation curve 510 shows very little deviation of linear fly height prediction 430 from curve 410 up to approximately 65 mW of power. Deviation curve 510 slopes upward between approximately 65 mW and 102 mW. At about 102 mW inflection point 520 occurs in deviation curve 510. Inflection point 520 can be identified intuitively as that point in deviation curve 510 where the slope of deviation curve 510 changes significantly from its upward trend. Mathematically inflection point 520 is identified from the second derivative of deviation curve 510 and solving for the TFC power which equates the second derivative of deviation curve 510 to zero.

Through experimentation a correlation has been established between inflection point 520 and contact between slider 115 and disk 120. Referring to FIG. 2, AE detector 219, when used in conjunction with embodiments of the present invention, verifies that acoustic emissions 218, which indicate contact of slider 115 with disk 120, coincide with the power delivered to TFC 310 at inflection point 520.

With continued reference to FIG. 5, AE signal curve 530 is plotted with deviation curve 510. Both AE signal curve 530 and deviation curve 510 are measured simultaneously from the same magnetic transducer, such as magnetic transducer 117. Good correlation can be seen between inflection point 520 and spike 535 in AE signal curve 530. This good correlation demonstrates that accuracy of the embodiments of the present invention for calibrating a fly height adjustment device, such as TFC 310.

Through experimentation, it has been demonstrated that within a batch of a particular TFC design there is consistency of plot 400 and plot 500 indicating a predictability of the performance within a batch of a particular TFC design. If the linear section 420 of curve 410 of a TFC being calibrated is similar to the linear section 420 of curve 410 a previously calibrated TFC, their inflection points 520 and efficiencies will also be similar.

In accordance with an embodiment of the present invention calibration of TFC 310 is accomplished by correlating the shape of plot 400 and/or plot 500 for a TFC being calibrated with a previously calibrated TFC and predicting inflection point 520 from the previously calibrated TFC with a similar plot 400 and/or plot 500 thereby avoiding contact of magnetic transducer 117 with magnetic recording data track 125. In accordance with an embodiment of the present invention, curve 410 and/or deviation curve 510 is used as a look-up curve to determine the TFC power where contact will occur. For example, a particular TFC being calibrated does not require to be brought into contact for calibration if its curve 410 is similar to a previously tested TFC. Therefore calibration of a TFC can be achieved without requiring contract to understand which TFC power level is required to cause contact.

FIG. 6 is a flow chart illustrating a process 600 for calibrating a fly height adjustment device, in accordance with an embodiment of the present invention. In accordance with an embodiment of the present invention, process 600 is embedded within an existing HGA tester such as a dynamic electrical tester (DET). In accordance with another embodiment of the present invention, process 600 is embedded in a dedicated tester for calibrating a fly height adjustment device such as a TFC. In accordance with another embodiment of the present invention, process 600 is embedded in a hard disk drive for calibrating at least one fly height adjustment device.

In one embodiment, process 600 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 600, such components are examples of components for carrying out process 600. That is, the embodiments of the present invention are well suited to performing various other components or variations of the components recited in FIG. 6. Within the present embodiment, it should be appreciated that the components of process 600 may be performed by software, by hardware, by an assembly mechanism, through human interaction, or by any combination of software, hardware, assembly mechanism, and human interaction.

Process 600 will be described with reference to elements shown in FIG. 2, FIG. 3, FIG. 4, and FIG. 5.

In one embodiment, as shown at 610 of process 600, magnetic transducer 117 coupled with HGA 110 flies at operational fly height 213 from magnetic recording data track 125, wherein magnetic transducer 117 is coupled with fly height adjustment device. Some examples of fly height adjustment device are: a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media; and a thermal fly height control (TFC) coupled with a magnetic transducer to urge the magnetic transducer closer to the magnetic recording media.

In one embodiment, as shown at 620 of process 600, a read-back signal amplitude is read with magnetic transducer 117 from magnetic recording data track 125. The read-back signal amplitude is read by read channel 220 which is similar and possibly the same as the read channel intended for use in the HDD in which HGA 110 will operate.

In one embodiment, as shown at 630 of process 600, operational fly height 213 is decreased with a fly height adjustment device, such as TFC 310. In accordance with an embodiment of the present invention, a fly height adjustment device comprises TFC 310 as presented in FIG. 3.

In one embodiment, as shown at 640 of process 600, a linear fly height prediction, such as linear fly height prediction 430, is generated from the read-back signal amplitude read by read channel 220 and from the power delivered to a fly height adjustment device, such as TFC 310, while operational fly height 213 is decreased using a fly height adjustment device, such as TFC 310. Linear fly height prediction, such as linear fly height prediction 430, is extrapolated from linear section 420 of curve 410, as shown in FIG. 4.

In one embodiment, as shown at 650 of process 600, the power delivered to fly height adjustment device is compared with a difference between a linear fly height prediction, such as linear fly height prediction 430 and an implied fly height from said read-back signal amplitude, such as curve 410, as shown in FIG. 4. The comparing comprises identifying an inflection point, such as inflection point 520 as shown in FIG. 5, in the difference between the linear fly height prediction and the implied fly height whereby contact of magnetic transducer 117 and magnetic recording data track 125 is determined.

In another embodiment, as shown at 652 of process 600, comparing a difference between a linear fly height prediction and an implied fly height comprises determining the efficiency of a fly height adjustment device, such as TFC 310, from the ratio of the linear fly height prediction, to the power delivered to a fly height adjustment device, such as TFC 310. With reference to plot 400 of FIG. 4, the efficiency of fly height adjustment device is the slope of linear fly height prediction 430.

In another embodiment, as shown at 654 of process 600, comparing a difference between a linear fly height prediction and an implied fly height comprises identifying from inflection point 520, the power delivered to fly height adjustment device for effecting contact of magnetic transducer 117 and magnetic recording data track 125. In accordance with an embodiment of the present invention, comparing a difference between a linear fly height prediction and an implied fly height comprises, utilizing a look-up curve from a previously recorded trend in curve 410 and/or deviation curve 510. A fly height adjustment device is calibrated when a match is made with a look-up curve and the power required to effect contact of magnetic transducer 117 with magnetic recording data track 125 is predicted. In this manner the fly height adjustment device is calibrated without contacting magnetic transducer 117 with magnetic recording data track 125.

In another embodiment, as shown at 656 of process 600, comparing a difference between a linear fly height prediction and an implied fly height comprises utilizing the efficiency of a fly height adjustment device, such as TFC 310, for determining the power delivered to fly height adjustment device for establishing a desired operational fly height 213. Inflection point 520 establishes the power level at which TFC 310 causes magnetic transducer 117 to contact magnetic data track 125. The efficiency of TFC 310 predicts nanometers of fly height per mW of power. By decreasing the power delivered to TFC 310 from the power level which causes contact of magnetic transducer 117 with magnetic recording data track 125, a desired fly height is achieved. For example, a TFC causes contact of a magnetic transducer with a magnetic recording data track at 100 mW. The efficiency of the TFC has been determined to be 0.1 nm/mW. The desired fly height is 5 nm. The power delivered to the TFC is reduced by 50 mW and achieves a 5 nm fly height.

In another embodiment, as shown at 658 of process 600, comparing a difference between a linear fly height prediction and an implied fly height comprises utilizing the power delivered to a fly height adjustment device, such as TFC 310, which is associated with inflection point 520, for defining a starting power level for fly height adjustment device from which to establishing a desired operational fly height 213.

The present invention, in the various presented embodiments provides calibration for a fly height adjustment device. Embodiments of the present invention provide an efficiency value for a fly height adjustment device, which is not achievable in the current art for HGA testing in a manufacturing environment. Embodiments of the present invention provide calibration for a fly height adjustment device without adding hardware, handling, and cost. The additional test time required is minimal at approximately two seconds and can be managed within the existing test time budget. Embodiments of the present invention enable 100% testing of HGAs in a manufacturing environment without additional cost, hardware, and operator intervention The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for calibrating a fly height adjustment device, said method comprising:
   flying a magnetic transducer coupled with a head gimbal assembly at a fly height from a magnetic recording data track, wherein said magnetic transducer is coupled with a fly height adjustment device;
   reading with said magnetic transducer a read-back signal amplitude from said magnetic recording data track;
   decreasing said fly height with said fly height adjustment device;
   generating a linear fly height prediction from said read-back signal amplitude and from power delivered to said fly height adjustment device during said decreasing said fly height; and
   comparing said power delivered to said fly height adjustment device with a difference between said linear fly height prediction and an implied fly height from said read-back signal amplitude, thereby calibrating said fly height adjustment device.

2. The method as recited in claim 1, wherein said decreasing said fly height comprising:
   decreasing said fly height using a thermal fly height control device.

3. The method as recited in claim 1, wherein said comparing said difference comprising:
   identifying an inflection point in said difference between said linear fly height prediction and said implied fly height whereby contact of said magnetic transducer and said magnetic recording data track is determined.

4. The method as recited in claim 3 further comprising:
   identifying from said inflection point said power delivered to said fly height adjustment device for effecting contact of said magnetic transducer and said magnetic recording data track.

5. The method as recited in claim 4 further comprising:
   utilizing said power delivered to said fly height adjustment device that is associated with said inflection point, for defining a starting power level for said fly height adjustment device from which to establishing a desired said fly height.

6. The method as recited in claim 4 further comprising:
   utilizing a look-up curve to match a previously recorded trend in said power delivered to said fly height adjustment device and said implied fly height from said read-back signal amplitude, thereby calibrating said fly height adjustment device without effecting said contact of said magnetic transducer and said magnetic recording data track.

7. The method as recited in claim 1, wherein said comparing said difference further comprising:
   determining the efficiency of said fly height adjustment device from the ratio of said linear fly height prediction, to said power delivered to said fly height adjustment device.

8. The method as recited in claim 7 further comprising:
   utilizing said efficiency for determining said power delivered to said fly height adjustment device for establishing a desired fly height.

9. A system for calibrating a fly height adjustment device, said system comprising:
   an apparatus for flying a magnetic transducer coupled with a head gimbal assembly at a fly height from a magnetic recording data track, wherein said magnetic transducer is coupled with said fly height adjustment device;
   a read channel for reading a read-back signal amplitude from said magnetic recording data track with said magnetic transducer;
   a fly height prediction generator for generating a linear fly height prediction from said read-back signal amplitude and from power delivered to said fly height adjustment device during said decreasing said fly height; and
   a comparator for comparing said power delivered to said fly height adjustment device with a difference between said linear fly height prediction and an implied fly height from said read-back signal amplitude, thereby calibrating said fly height adjustment device.

10. The system of claim 9, wherein said apparatus for flying said magnetic transducer comprises a spin stand.

11. The system of claim 9, wherein said apparatus for flying said magnetic transducer comprises a hard disk drive.

12. The system of claim 11 further comprising:
    a power delivery identifier for identifying from said inflection point said power delivered to said fly height adjustment device for effecting contact of said magnetic transducer and said magnetic recording data track.

13. The system of claim 9, wherein said fly height adjustment device comprises a thermal fly height control device.

14. The system of claim 13 further comprising:
    a power delivery adjuster for utilizing said efficiency for determining said power delivered to said fly height adjustment device for establishing a desired fly height.

15. The system of claim 9, wherein said comparator comprises:
    an inflection point identifier for identifying an inflection point in said difference between said linear fly height prediction and said implied fly height whereby contact of said magnetic transducer and said magnetic recording data track is determined.

16. The system of claim 15 further comprising:
    a starting power level identifier for defining a starting power level from which to start applying power to said fly height adjustment device for establishing a desired said fly height.

17. The system of claim 9, wherein said comparator comprises:
    an efficiency calculator for determining the efficiency of said fly height adjustment device from the ratio of said linear fly height prediction to said power delivered to said fly height adjustment device.

18. A computer-readable memory containing executable instructions, wherein said instruction when executed effect a method for calibrating a fly height adjustment device, said method comprising:
    flying a magnetic transducer coupled with a head gimbal assembly at a fly height from a magnetic recording data track, wherein said magnetic transducer is coupled with a fly height adjustment device;
    reading with said magnetic transducer a read-back signal amplitude from said magnetic recording data track;
    decreasing said fly height with said fly height adjustment device;
    generating a linear fly height prediction from said read-back signal amplitude and from power delivered to said fly height adjustment device during said decreasing said fly height; and
    comparing said power delivered to said fly height adjustment device with a difference between said linear fly height prediction and an implied fly height from said read-back signal amplitude, thereby calibrating said fly height adjustment device.

19. The computer-readable memory as described in claim 18, wherein said decreasing said fly height comprising:

decreasing said fly height using a thermal fly height control device.

20. The computer-readable memory as described in claim 18, wherein said comparing said difference comprising:

identifying an inflection point in said difference between said linear fly height prediction and said implied fly height whereby contact of said magnetic transducer and said magnetic recording data track is determined.

21. The computer-readable memory as described in claim 20 further comprising:

identifying from said inflection point said power delivered to said fly height adjustment device for effecting contact of said magnetic transducer and said magnetic recording data track.

22. The computer-readable memory as described in claim 21 further comprising:

utilizing said power delivered to said fly height adjustment device that is associated with said inflection point, for defining a starting power level for said fly height adjustment device from which to establishing a desired said fly height.

23. The computer-readable memory as described in claim 21 further comprising:

utilizing a look-up curve to match a previously recorded trend in said power delivered to said fly height adjustment device and said implied fly height from said read-back signal amplitude, thereby calibrating said fly height adjustment device without effecting said contact of said magnetic transducer and said magnetic recording data track.

24. The computer-readable memory as described in claim 18, wherein said comparing said difference further comprising:

determining the efficiency of said fly height adjustment device from the ratio of said linear fly height prediction, to said power delivered to said fly height adjustment device.

25. The computer-readable memory as described in claim 24 further comprising:

utilizing said efficiency for determining said power delivered to said fly height adjustment device for establishing a desired fly height.

* * * * *